(12) United States Patent
Atutxa Briones et al.

(10) Patent No.: US 12,064,933 B2
(45) Date of Patent: Aug. 20, 2024

(54) WIND TURBINE BLADE

(71) Applicant: Siemens Gamesa Renewable Energy Innovation & Technology S.L., Sarriguren (ES)

(72) Inventors: Mikel Atutxa Briones, Bizkaia (ES); Pedro Jato Losfablos, Pamplona (ES); Jorge Lana Galdeano, Navarra (ES); Leyre Redin Larrea, Pamplona (ES); Nicolas Rojo Saiz, Navarra (ES)

(73) Assignee: Siemens Gamesa Renewable Energy Innovation & Technology S.L., Sarriguren (ES)

( * ) Notice: Subject to any disclaimer, the term of this patent is extended or adjusted under 35 U.S.C. 154(b) by 107 days.

(21) Appl. No.: 17/640,948

(22) PCT Filed: Sep. 11, 2020

(86) PCT No.: PCT/EP2020/075547
§ 371 (c)(1),
(2) Date: Mar. 7, 2022

(87) PCT Pub. No.: WO2021/048407
PCT Pub. Date: Mar. 18, 2021

(65) Prior Publication Data
US 2022/0333573 A1    Oct. 20, 2022

(30) Foreign Application Priority Data

Sep. 13, 2019  (EP) .................................... 19380020
Oct. 31, 2019  (EP) .................................... 19380027

(51) Int. Cl.
*B63H 1/26*     (2006.01)
*B29D 99/00*    (2010.01)
(Continued)

(52) U.S. Cl.
CPC ....... *B29D 99/0028* (2013.01); *F03D 1/0675* (2013.01); *B29C 70/30* (2013.01); *B29L 2031/085* (2013.01); *F05B 2280/6003* (2013.01)

(58) Field of Classification Search
CPC ....... F03D 1/0675; Y02E 10/72; Y02E 10/74; B29L 2031/085; B29D 99/0028;
(Continued)

(56) References Cited

U.S. PATENT DOCUMENTS

| 8,622,709 B2 | 1/2014 | Kuroiwa |
| 2012/0183408 A1* | 7/2012 | Noerlem ............... B29C 70/023 |
| | | 156/60 |

(Continued)

FOREIGN PATENT DOCUMENTS

| DK | 201770744 A1 | 10/2018 |
| EP | 2791500 B1 | 12/2012 |

(Continued)

OTHER PUBLICATIONS

International Search Report & Written Opinion for PCT/EP2020/075547 issued Dec. 14, 2020.

*Primary Examiner* — Long T Tran
*Assistant Examiner* — James J Kim
(74) *Attorney, Agent, or Firm* — Schmeiser, Olsen & Watts LLP (57) ABSTRACT

Provided is a turbine blade, including shells and webs connected to the shells, with, with each web being supported by reinforcement structures, whereby a first reinforcement structures includes at least one stack composed of several pultruded composite strips including carbon fibers with the strips being fixed in a resin matrix, and a second reinforcement structures supporting a second web either include at least one stack composed of glass and/or carbon fiber layers (Continued)

infused with resin, the stack being disposed between an outer and an inner layer of upper and lower shell, or at least one stack composed of glass and/or carbon fiber layers infused with resin or of several pultruded composite strips including carbon fibers with the strips being fixed in a resin matrix, which stack is an integral part of the second web and builds the flange.

11 Claims, 4 Drawing Sheets

(51) Int. Cl.
*F03D 1/06* (2006.01)
*B29C 70/30* (2006.01)
*B29L 31/08* (2006.01)

(58) Field of Classification Search
CPC ......... B29D 99/0014; F05B 2280/6003; F05B 2240/301; F05B 2280/702; F05B 2230/50; F05B 2280/6013; B29C 70/52
USPC .......................................... 416/233 R, 223 R
See application file for complete search history.

(56) References Cited

U.S. PATENT DOCUMENTS

| | | | |
|---|---|---|---|
| 2014/0064980 A1* | 3/2014 | Griesel | F03D 1/0675 156/305 |
| 2014/0301859 A1 | 10/2014 | Hancock et al. | |
| 2017/0058865 A1* | 3/2017 | Caruso | F03D 80/40 |
| 2017/0218918 A1 | 8/2017 | Cieslak et al. | |
| 2018/0372065 A1 | 12/2018 | Livingston et al. | |
| 2019/0153994 A1* | 5/2019 | Tobin | B29C 64/393 |
| 2019/0195190 A1* | 6/2019 | Girolamo | B29D 99/0028 |
| 2019/0211806 A1* | 7/2019 | Girolamo | B29D 99/0025 |

FOREIGN PATENT DOCUMENTS

| | | |
|---|---|---|
| EP | 3 418 557 A1 | 12/2018 |
| EP | 3418557 A1 | 12/2018 |
| EP | 2 791 500 B1 | 3/2019 |
| WO | WO 2016015736 A1 | 2/2016 |
| WO | WO 2016101953 A1 | 6/2016 |

* cited by examiner

WIND TURBINE BLADE

CROSS-REFERENCE TO RELATED APPLICATIONS

This application claims priority to PCT Application No. PCT/EP2020/075547, having a filing date of Sep. 11, 2020, which claims priority to EP Application No. 19380027.3, having a filing date of Oct. 31, 2019, and EP Application No. 19380020.8, having a filing date of Sep. 13, 2019, the entire contents all of which are hereby incorporated by reference.

FIELD OF TECHNOLOGY

The following relates to a wind turbine blade, with a generally hollow blade body comprising an upper and a lower half shell and first and second elongated webs each extending in the lengthwise direction of the blade and being disposed between and connected to the upper and the lower half shell, with the second web being arranged closer to the trailing edge of the blade and extending only along a part of the trailing edge, with each web comprising an upper and a lower flange connecting the respective web to the respective half shell, and with the first and second webs being supported via respective first and second reinforcement structures relative to the respective half shell, which reinforcement structures extend in the lengthwise direction of the blade.

BACKGROUND

As commonly known, wind turbine blades are parts of a wind turbine which is used for generating electric power. A wind turbine usually comprises three blades attached to a hub, which is connected to a generator arranged in a nacelle. The blades interact with the passing wind resulting in a rotation of the hub finally driving the generator.

A turbine blade usually comprises a hollow blade body with an upper and a lower half shell, which are usually separately produced and fixed to each other. Within this hollow blade body first and second elongated webs are arranged, which connect both half shells and support them while also transferring the loads acting on the respective shells due to aerodynamic reasons and the circular movement of the blade when rotating. The load comprises pressure and suction loads on the upper and lower half shell and compressive and tensile loads. A wind turbine blade with this common setup is for example disclosed in EP 2 791 500 B1.

For supporting the half shells and for transferring the respective loads each elongated web extends in the lengthwise direction and is connected to the respective half shell via a flange provided at the respective web side, which flange is attached to an inner layer of the upper and lower half shell by an adhesive. For transferring the loads respectively supporting the respective shells each web is supported via respective first and second reinforcement structures relative to the respective half shell. Such a reinforcement structure is commonly also named as a spar cap. Like the respective webs and their flanges, also these reinforcement structures or spar caps extend in a lengthwise direction of the blade. These reinforcement structures, as for example also disclosed in EP 2 791 500 B1, are made of stacks comprising separate carbon fiber pultrusion strips, which are arranged above each other and fixed in a resin matrix. During the manufacturing of such a pultruded strip the carbon fibers are pulled through a supply of liquid resin, which resin is then heated and cured finally forming the respective pultruded strip. These pultruded carbon fiber strips show excellent mechanical properties in taking the respective loads and distributing them and also absorb high bending moments which arise during the blade rotation.

In a known wind turbine blade design as for example disclosed in EP 2 791 500 B1 the blade comprises two first webs, which extend almost entirely over the length of the blades and which are arranged in the central body area, i.e., in the area, where the upper and lower half shell, seen in the drop-like cross section, have a large distance. Also, a second web is provided, which second web is arranged close to the trailing edge of the blade. This second web extends only along a part of the trailing edge, which part often has a specific edge design and is subjected to specific loads, which are taken respectively distributed by this second web.

All webs comprise an elongated web body with the flanges arranged at the ends of the web body. Each web is supported by two reinforcement structures, i.e., spar caps, so that in total six spar caps are arranged in both shells for supporting the three webs. As three webs and six spar caps need to be integrated, the total mass of such a known turbine blade is high, although the mass of the spar caps itself is somehow reduced due to the usage of carbon fiber pultrusion stacks, which on the other hand are expensive.

SUMMARY

An aspect relates to an improved wind turbine blade design allowing a proper load support and having a less complex and heavy design.

For addressing this problem, a wind turbine blade as mentioned above is characterised in that the first reinforcement structures supporting the single first web comprise at least one stack composed of several pultruded composite strips comprising carbon fibers with the strips being fixed in a resin matrix, and that the second reinforcement structures supporting the second web
- either comprise at least one stack composed of glass and/or carbon fiber layers infused with resin, the stack being disposed between an outer and an inner layer of the respective upper and lower shell, to which inner layer the respective flanges of the second web are attached,
- or at least one stack composed of glass and/or carbon fiber layers infused with resin or of several pultruded composite strips comprising carbon fibers with the strips being fixed in a resin matrix, which stack is an integral part of the second web and builds the respective flange, which is attached to the inner layer of the respective upper and lower shell.

The inventive wind turbine blade is first characterised in that only one first web and only one second web is arranged in the hollow body. Unlike in the conventional art using two first webs, the inventive turbine blade uses only one first web which can be arranged in an optimal location. Seen in the cross section of the blade it is centered in the maximum profile thickness point, thus a region where the maximum loads are present. As only one web is arranged, only two spar caps are needed for supporting the one single first web relative to the half shells. This allows for reducing the overall mass of the blade remarkably. Also, the carbon fiber amount respectively the number of carbon fiber pultruded strip stacks is reduced, as only two spar caps respectively reinforcement structures are needed for supporting the first web reducing the overall costs for producing the blade. Finally, as only one first web is arranged, only two adhesive connections of the web flanges to the inner layers of the half shells are necessary, which is advantageous for a faster production and allows for an easier repair is needed.

Second, the inventive turbine is also characterised in a specific layout regarding the second web respectively the second reinforcement structures. In a first alternative, the second reinforcement structures supporting the second web comprise at least one stack composed of glass and/or carbon fiber layers infused with resin. This stack is disposed between the outer and the inner layer of the respective upper and lower shell in an area adjacent to the position where the flanges of the second web are attached to the respective inner layer by an adhesive. According to this alternative, the second reinforcement structures do not comprise any pultruded carbon fiber strips but are made of a stack of glass and/or carbon fiber layers respectively fiber fabrics, which are stacked above each other, and which are infused with resin. Thus, they are produced in a commonly known manner, as also for example the inner and outer layer of the respective shell is produced, which layers are made of several separate fiber layers or fabrics infused with resin. The making of these second reinforcement structures according to this alternative therefor is simplified and goes along the usual production routine. If only glass fiber layers or fabrics are used, the production of these reinforcement structures can be incorporated in the production of the respective half shell, and the respective glass fiber and/or carbon fiber layers can easily be arranged in the respective shell mould together with other shell components and can be resin infused together with all the other components. Thus, an integration in the common production routine is easily possible.

In a second alternative, the at least one stack forming the respective second reinforcement structure is composed either of glass and/or carbon fiber layers infused with resin or of several pultruded composite strips comprising carbon fibers with the strips being fixed in a resin matrix. In this embodiment the respective second spar cap can be made of glass or carbon fiber fabrics or of carbon fiber pultrusion strips. Regardless of the material used for making the respective reinforcement structure, this reinforcement structure is an integral part of the second web and builds the respective flange, which is attached to the inner layer of the respective shell by the adhesive. The second web according to this embodiment has a H-shape with a central web body and the integral flanges attached to the web body. As the web body comprises a resin matrix, this matrix also integrally extends into the respective flanges respectively stacks making the H-shaped second web very stiff and a mechanically well adapted piece. The web body may comprise a core for example made of balsa wood, PET or PVC which is arranged in a glass fiber envelope or casing which is resin infused. When producing the web, all respective parts can easily be arranged in a common web mould by simply inserting the respective core and the fiber layers respective fabrics or the pultruded strips and by finally infusing the total web setup.

A specific advantage of this embodiment is that this H-shaped web can be produced external to the respective shells, already comprising the respective spar cap. This allows a simplified production of the spar caps and especially allows for a proper inspection of the web respectively the connection of the reinforcement structures, i.e., the spar caps to the web body. Furthermore, the adhesive connection of the web flanges, i.e., the spar caps, to the inner layer of the upper and the lower shell needs to take less loads, and the respective reinforcement structures respectively the spar caps are an integral part of the web.

Independent of which of the two embodiments of the second web setup is provided, the inventive wind turbine blade has an improved design over known blade design. First, only a single first web is used needing only a single spar cap arranged in the upper shell and the lower shell. While the known turbine blade comprising two first webs with respective two spar caps in each shell, which can be named as a bi-cap design, the inventive turbine blade comprises only a single spar cap supporting the first web and can therefore be called as a mono—cap design. The production is therefore simplified, also the use of expensive carbon fiber-based material is reduced. Further, the specific design of the second reinforcement structures is advantageous over known turbine blades, as in the first alternative embodiment the respective spar caps are produced in a commonly known manner by providing respective fiber fabric stacks being resin infused, which simplifies the overall production and avoids the use of expensive carbon fibers. In the second alternative embodiment a specific H-shaped web design is used, which also allows a simplified production.

The first reinforcement structures are according to an embodiment of the invention disposed between an outer and an inner layer of the respective upper and lower shell. The stacks of the carbon fiber pultrusion strip are an integral part of the respective shell and are sandwiched between the outer and inner shell layer at a position adjacent to where the respective flange of the first web is attached at the inner surface of the inner layer.

In an embodiment, each of the first reinforcement structures comprises more than one stack arranged in parallel, three stacks which are arranged adjacent to each other. This allows for shaping the overall shape of the first reinforcement structures, i.e., the spar caps, along the slightly bended shape of the respective upper and lower shell, so that the respective spar caps closely follow the shell shape and that the distance between the upper and lower surface of the respective stack to the neighbouring outer and inner layer is small. This avoids that in these areas the thickness of the outer or inner layer needs to be raised or that thicker resin areas need to be provided. The overall mass of the blade can therefore be further reduced.

The first reinforcement structures may furthermore comprise biaxial glass and/or carbon fiber layers between each pair of strips which layers are infused with resin. For bonding the strips to each other fiber layers or fiber fabrics are inserted between the respective strips of the stack. The overall stack therefore has a sandwich setup with a pultruded strip is followed by a fiber layer or fabric which is followed by another strip etc. Inventively the biaxial fiber layers are infused with resin, which resin builds the resin matrix into which the whole stack is embedded. A biaxial fiber layer comprises fibers being arranged at an angle of 0° and other fibers being arranged at an angle of e.g., ±45°. Such a biaxial layer is advantageous, as it allows to take loads of different directions respectively of different types, e.g., loads due to a flap wise or an edgewise bending of the blade.

As the pultrusion stack is produced external to the respective half shell, its design can be adjusted to the respective needs simply by using a respective mould for infusing the pultrusion strip stack arranged in the mould together with the biaxial layers. The prefabricated first reinforcement structure is then arranged in a respective shell mould for finally being embedded in the respective resin when the shell is finally infused.

Also, the second reinforcement structures may each comprise more than one stack arranged in parallel. The two or for example three stacks are either built in the shell mould, when the second reinforcement structure is an integral part of the upper or lower shell. In this case the respective separate glass and/or carbon fiber layers are stacked above each other layer after layer, and are then infused with a resin, when the overall infusion of the respective shell half is performed. Or, in the second embodiment, the respective stacks comprising the fabric layers are built in the respective structure mould and are infused with the resin for embedding the respective layers, which externally produced reinforcement structures are then arranged in the respective shell mould for finally being embedded in the shell resin.

In a further embodiment of the invention the glass and/or carbon fiber layers, which are stacked, and which make the second reinforcement structure, are uniaxial layers. These layers solely comprise parallel fibers extending in the lengthwise direction of the blade. Using uniaxial layers is advantageous for supporting loads due to a flap wise bending. Uniaxial layers may be used either if the respective second reinforcement structures are integrally arranged in the upper and lower shell, or when the second reinforcement structures are an integral part of the H-shaped second web itself.

As mentioned above, an alternative embodiment regarding the second web setup comprises the second reinforcement structures being an integral flange of the second web. If such a H-shaped second web is used, at least one core element is provided between the inner and the outer layer of the upper and lower half shell adjacent to the respective integral second reinforcement structures of the second web attached to the inner layer. The integration of this core element integral into the upper and lower half shell stiffens the respective shell in this area, where the second web is arranged. This core supports the web joint realised by the adhesive by which the respective reinforcement structure flanges, i.e., the web integral spar caps are attached to the inner surface of the inner layers of the half shells. It provides a better support and load transfer via the second web.

The core elements can be made of different materials, for example balsa wood, a polymer or a composite material for example again comprising fiber layer or fabrics being infused with a resin. The core, no matter what material is used, is an integral part of the respective shell and is sandwiched between the outer and inner layer. If a wooden or polymer core element is used, this element is produced as a preform and is then inserted into the respective shell mould, when the respective layers or elements for setting up the respective half shell are inserted into the shell mould. It is fixed to the shell by the resin. In case core elements being made of composite material like glass fiber layers are used, the respective layer stack may be provided directly in the shell mould and may then be co-infused with the resin when the overall shell infusion is performed.

As mentioned above, the respective reinforcement structure and also the respective core elements are used for supporting the respective webs respectively web joints. They are used for stiffening the shell area, adjacent to which the respective web flanges are attached and are thus an important part regarding the load support respectively the load distribution. It is therefore advantageous, when the first reinforcement structures and/or the second reinforcement structures and/or the core elements, all of which are an integral part of the respective shell, have a greater width than the respective adjacent flange of the respective first and/or second web. The respective structure or core element, seen in the drop-like cross section, is wider than the respective flange of the respective web. It extends over the respective flange sides, what allows for a better support and load distribution. In an embodiment, all reinforcement structures respectively also the core elements are wider than the respective web flanges.

For adjusting the mechanical properties of the blade also in areas next to the respective reinforcement structures or core elements integrated into the respective half shell, several further core elements are provided between the outer and the inner layer of the respective upper and lower half shell. These core elements may be made of foam, wood or polymer for example, while also this enumeration is not final.

Embodiments of the invention also refer to a wind turbine comprising several wind turbine blades as described, three turbine blades.

BRIEF DESCRIPTION

Some of the embodiments will be described in detail, with reference to the following figures, wherein like designations denote like members, wherein.

DETAILED DESCRIPTION

Figure 1:
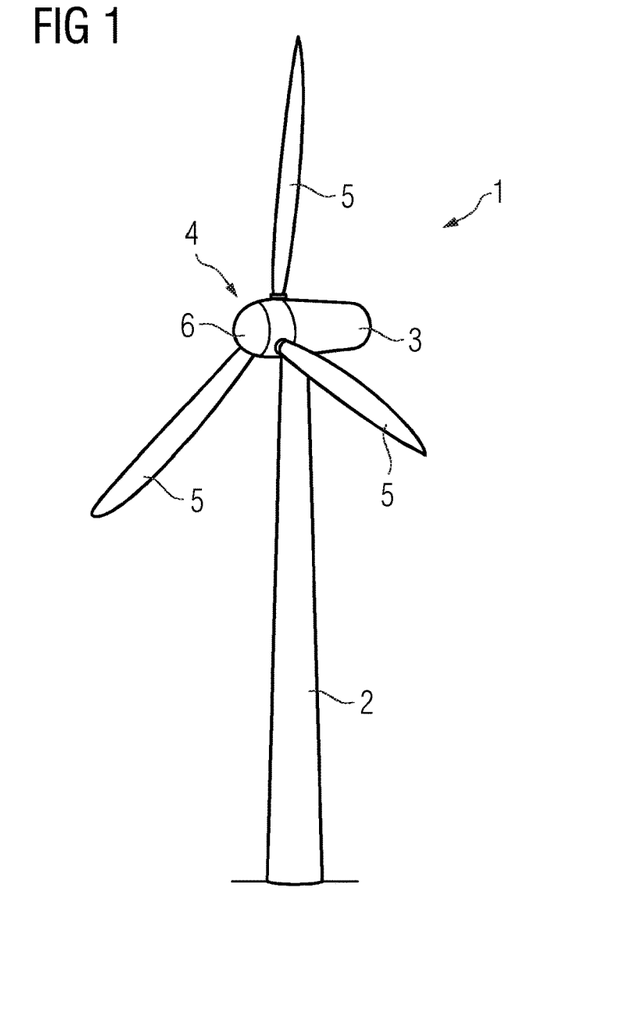
FIG. 1 shows a principal sketch of a wind turbine.

FIG. 1 shows a principal sketch of a wind turbine 1 comprising a tower 2, a nacelle 3 mounted on top of the tower 2 and a rotor 4 comprising three wind turbine blades 5 attached to a hub 6, which is operatively coupled to a generator arranged in the nacelle 3, which generator is driven by the rotational energy of the rotor 4 for producing electric power as commonly known. Embodiments of the invention relate to the setup of the wind turbine blades 5.

Figure 2:
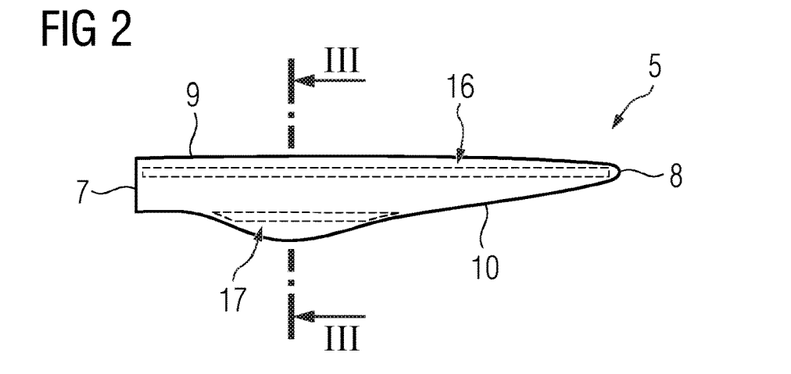
FIG. 2 shows a view of an inventive wind turbine blade comprising a first web and a second web.

FIG. 2 shows a principle drawing of a turbine blade 5 with a root 7 for attaching the blade 5 to the hub and with a tip 8 at the other blade end. It furthermore comprises a leading edge 9 and a trailing edge 10.

Figure 3:
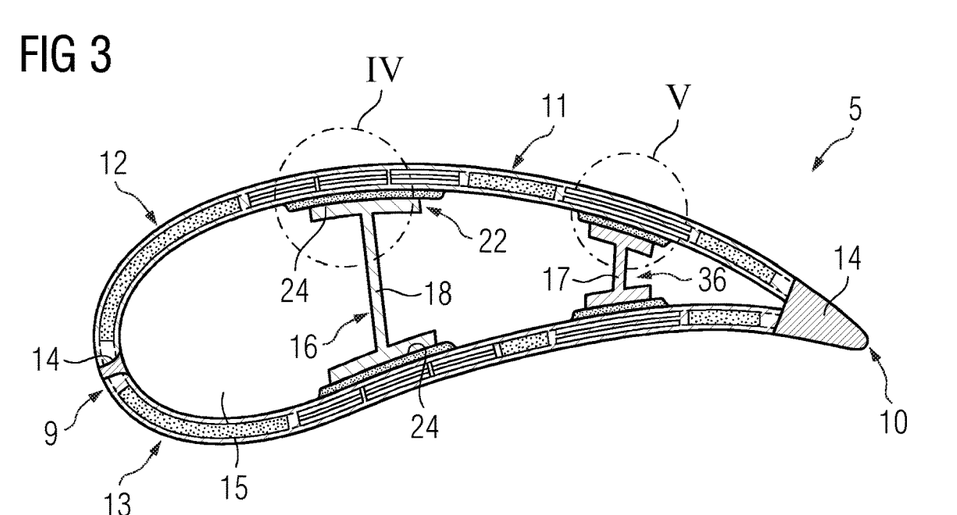
FIG. 3 shows a cross section through the blade of FIG. 2 along the line III-III.

The blade 5 comprises, see FIG. 3, a hollow blade body 11, which is made of an upper half shell 12 and a lower half shell 13, which are fixed to each other with an adhesive 14 and which encase a hollow space 15. In this space 15 a first web 16 and a second web 17 are arranged. The first web 16 is arranged almost in the center of the hollow space 15, at a position where the upper half 12 and the lower half 13 have the greatest distance respectively the blade has its maximum profile thickness. As FIG. 2 shows, the web 16 extends almost over the whole length of the blade 5 starting adjacent to the root 7 and ending adjacent to the tip 8.

The second web 17 is arranged close to the trailing edge 10 and extends only over a part of the blade length as shown in FIG. 2.

Both first and second webs 16, 17 are used for supporting the blade shells 12, 13 and for taking and distributing the respective loads resting on the blade and resulting from aerodynamic reasons due to the rotation of the rotor 4 and mechanical reasons due to the weight of the blade 5 itself.

Figure 4:
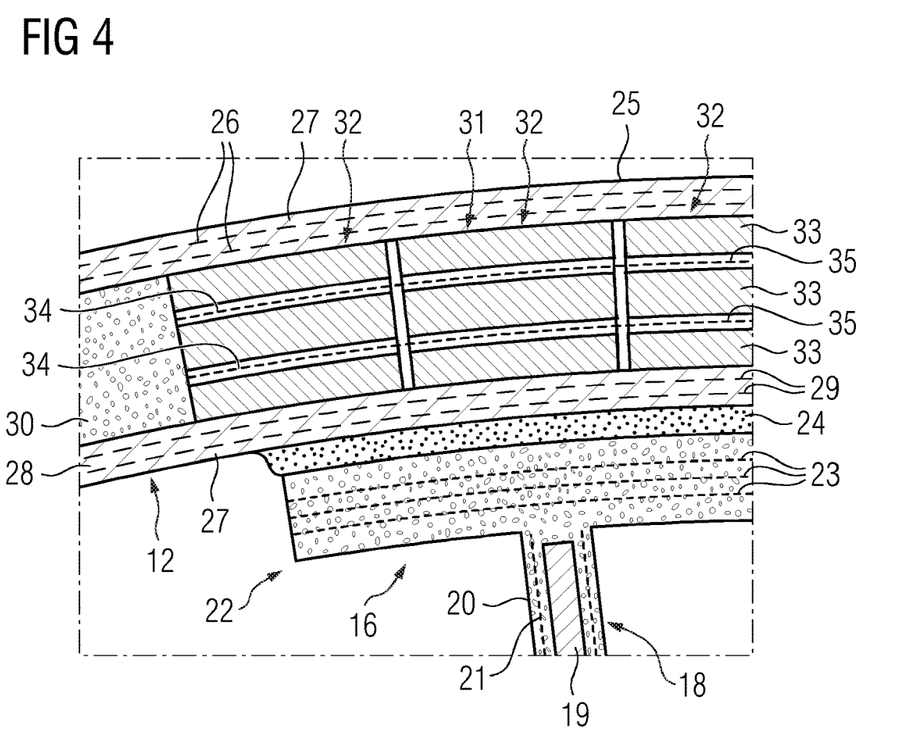
FIG. 4 shows an enlarged view of the section IV of FIG. 3.

The first web 16 comprises a web body 18 which, see for example FIG. 4, comprises a core 19, for example made of balsa wood, a stable foam or a composite material etc. showing the needed mechanical properties for stiffening the whole web 16. The core 19 is encased in one or more glass fiber layers 20 which are resin infused, i.e., embedded in a cured resin 21.

The web 16 further comprises a flange 22 which is an integral part of the web 16 and which is integrally attached to the web body 18. The flange 18 also comprises several layers 23 of glass fibers, i.e., glass fiber fabrics, which are stacked above each other, and which are also resin infused and embedded in the resin 21. The fiber stack making the respective flange 22 may comprise biaxial and uniaxial fibers, but uniaxial fibers for stiffening the flange against a flap wise bending.

Each of the two flanges 22 of the first web 16 is attached to the inner surface of the upper half shell 12 and the lower half shell 13 by an adhesive 24, see also FIG. 4.

FIG. 4 also shows a cross section of a part of the upper half shell 12, showing the respective shell setup, which setup is the same for the lower half shell 13. Each shell 12, 13 comprises an outer layer 25 comprising several glass fiber layers or fabrics 26 which are resin infused, i.e., embedded in a resin 27. An inner layer 28 of the shell 12 is provided comprising several glass fiber layers 29, which are also embedded in the resin 27. The space between the outer and inner layer 25, 28 is filled with a core material 30, for example a stable foam material or balsa wood, as long as in this area no reinforcement structures are incorporated into the respective half shell 12, 13.

FIG. 4 shows the enlarged section IV of FIG. 3, in which the first web 16 is attached to the inner surface of the inner layer 28 of the upper shell 12. The same setup is also realised at the attachment section of the lower flange 22 to the lower shell 13. In this area a first reinforcement structure 31, i.e., a first spar cap is integrally inserted in the upper shell 12. The first reinforcement structure 31 comprises in total three stacks 32 being arranged next to each other and sandwiched between the outer layer 25 and the inner layer 28. Each stack 32 comprises several carbon fiber pultrusion strips 33. These carbon fiber pultrusion strips 33 comprise uniaxial carbon fibers being pulled through a liquid resin supply, which resin is afterwards cured, so that the carbon fibers are firmly embedded in the respective resin forming a resin matrix. Between two neighbouring carbon fiber pultrusion strips 33 one or more biaxial glass fiber layers 34 are arranged, which are embedded in a resin 35, so that they are resin infused and thus fix the respective strips 33. The resin infusion may also encase the strips 33 along their sides and upper and lower surfaces. The respective stacks 32 are built external to the respective shell 12, 13 and are inserted in the respective shell mould, when the shell is produced.

As can be seen from FIG. 3, the first reinforcement structures extend a wider than the respective flanges 22 providing a very good support of the flanges 22. By using, in this example, three separate stacks 32 it is possible to closely follow the overall bended shape of the respective shell 12, 13, so that the respective stacks 32 can be very closely attached to the respective upper and lower layer 25, 28.

From FIG. 3 it is obvious that the respective shell 12, 13 comprises only one single first reinforcement structure respectively first spar cap 31, as only a single first web 16 is provided and centered in the maximum profile thickness area.

Figure 5:
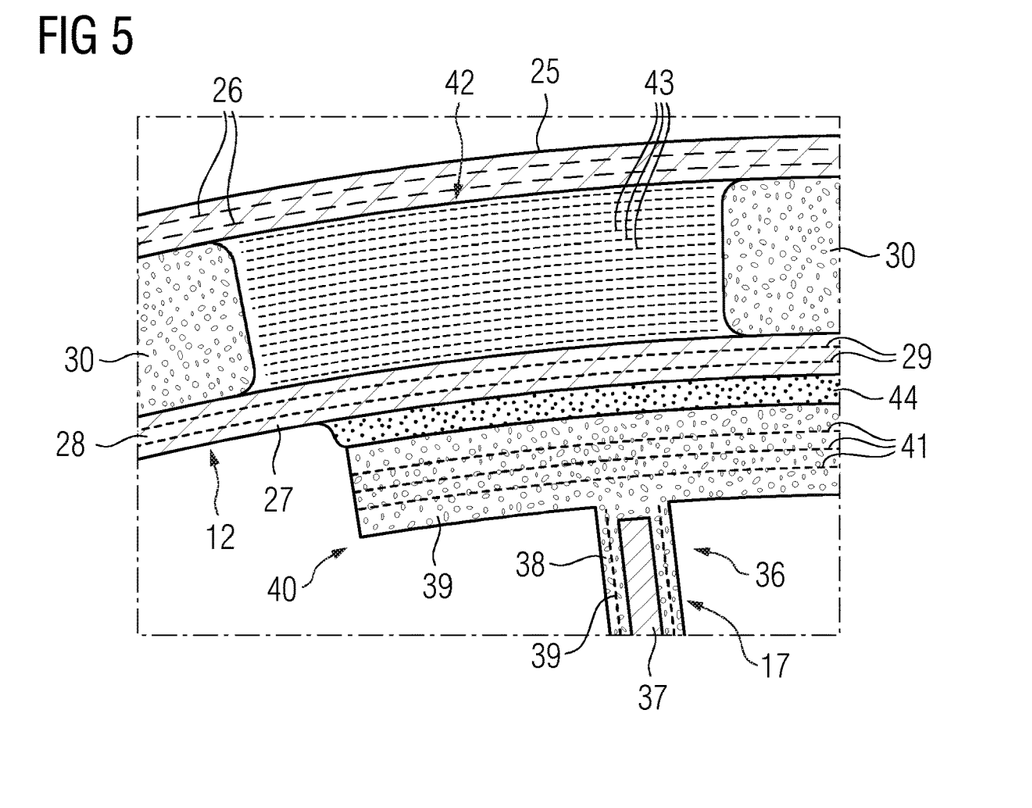
FIG. 5 shows an enlarged view of the section V of FIG. 3.

FIG. 5 shows an enlarged principle sketch of the section V of FIG. 3 with the attachment of the second web 17 to the upper shell 12. The same setup is also realised at the attachment of the web 17 to the lower shell 13.

Also, the web 17 comprises a web body 36 with a core 37, i.e., made of balsa wood or the like, which is encased in one or more glass fiber layers 38 being embedded in a resin 39, i.e., a resin matrix.

The second web 16 further comprises two flanges 40, each being built of several uniaxial glass fiber layers 41 being stacked above each other and being embedded in a resin 39 for making the flange 40 integral with the body 36. Also, this second web 17 is prebuilt as a separate component which is arranged in the respective shell mould when the shell is produced.

Also, the flanges 40 of the second web 17 are attached to the inner surface of the inner layer 28 comprising the glass fiber layers or fabrics 29 embedded in the resin 27 by an adhesive.

For supporting the second web in each upper and lower shell 12, 13 a second reinforcement structure 42 is integrally arranged between the outer layer 25 and the inner layer 28. This second supporting structure respectively second spar cap 42 is built by several glass and/or carbon fiber layers or fabrics 43 which are resin infused, i.e. embedded in the resin 27, which also embeds the respective fiber layers 26 and 29 of the outer and inner layer 25, 28. When producing the respective half shell 12, 13, the respective glass and/or carbon fiber layers 43 are inserted in the respective shell mould as dry fibers and are then resin infused together with the outer and inner layer 25, 28, i.e. all respective parts are then infused in the respective resin 27, so that the respective second reinforcement structure 42 respectively the second spar cab 42 is an integral, laminate configuration or part of the respective half shell 12, 13.

As in this embodiment the turbine blade 5 comprises only one single first web 16 and only one single second web 17 extending only along a shorter length of the trailing edge, the overall weight of the blade is remarkably reduced. Due to the integration of only one first web 16, it is possible to arrange this first web at an optimal position regarding the load distribution along the blade in a longitudinal and transverse direction. Further only one spar cap per half shell is used, allowing for the further mass reduction, and the rest of the cavity between the outer and inner layer may be filled with a lightweight foam or the like. Using only one spar cap furthermore reduces the amount of carbon fibers used, which carbon fibers are fairly expensive.

The setup of the second reinforcement structures 42 in a different way compared to the first reinforcement structures 31 allows for a simple integration of these reinforcement structures 42, as they can be integrally built together with the half shell itself, as the respective fiber layers making the reinforcement structure can be easily placed in the shell mould and be co-infused with all shell components in the respective resin.

Figure 6:
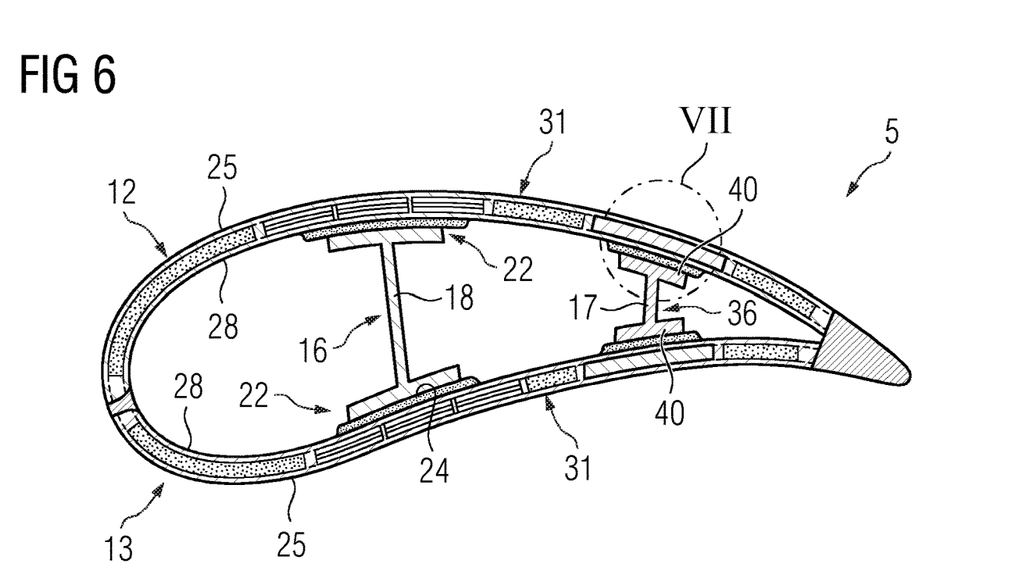
FIG. 6 shows a cross sectional view of an inventive wind turbine blade of a second embodiment.
Figure 7:
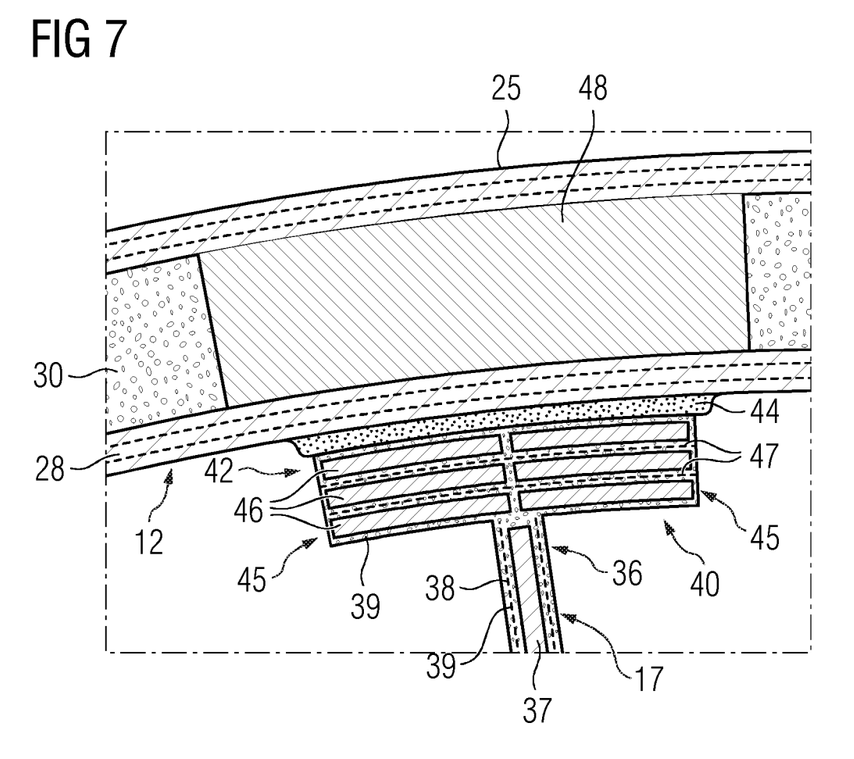
FIG. 7 shows an enlarged view of the section VII of FIG. 6.

A second embodiment of the invention is shown in FIGS. 6 and 7. Same reference numbers are used for the same components.

The turbine blade 5 shown in FIG. 6 also comprises only a single first web 16 having a web body 18 and two integral flanges 22 fixed to the inner layer 28 of the upper and lower shell 12, 13. Between the inner layer 28 and the respective outer layer 25 of each shell 12, 13 the carbon fiber pultrusion strip based first reinforcement structures 31, i.e., the first carbon fiber pultrusion spar caps are integrated. The setup of the blade in this blade section is the same as described in regard to the previous embodiment.

Different to the blade 5 according to FIGS. 3-5 is the setup at the second web 17. The second web 17 again comprises a web body 36 and two flanges 40, which are also attached to the respective inner layers 28 of the upper and the lower shell 12, 13 by an adhesive 44, comparable to the mounting according to FIG. 5.

In this embodiment the design of the second web 17 and the design of the upper and lower half shell 12, 13 in the area adjacent to the second web 17 is different as shown in FIG. 7.

FIG. 7 shows an enlarged section VII of FIG. 6. It shows the second web 17 with the web body 36 comprising a core 37 for example made of balsa wood or the like, which is encased in a glass fiber structure comprising one or more glass fiber layers 38 which are infused with a resin 39. The flange 40 in this embodiment is at the same time also the second reinforcement structure 42, which second reinforcement structure being an integral part of the web 17. In this embodiment the flange 40 respectively the second reinforcement structure 42 is for example made again of two stacks 45, each stack 45 being built from several carbon fiber protrusion strips 46 comprising the respective uniaxial carbon fibers embedded in a cured resin matrix. Between each pair of strips 46 one or more biaxial glass fiber layers 47 are arranged, which are, together with respective stacks 45, infused with a resin 39. Thus, the resin 39 completely builds the whole resin matrix of the second web 17 and thus makes the second reinforcement structures 42 an integral part of the second web 17. These second webs 17 with the integral reinforcement structures 42, i.e., the integral spar caps 42, are again produced separately as separate components. This allows for a very good and precise manufacturing and inspection of the respective webs regarding their quality.

For stiffening the upper and lower shell 12 in the area adjacent to the second web 17 respectively the flanges 40, which are again attached to the inner layer 28 by an adhesive 44, one or more core elements 48 are sandwiched between the outer layer 25 and the inner layer 28. This core element or elements 48 may for example be made of wood, especially balsa wood, of a stable foam, especially a polymer foam or a composite material. In any way this core element 48 has a higher density than for example the foam 30 encasing the core element 48. Again, the width of this or these core elements 48 is wider than the width of the respective flanges 40, i.e., the reinforcement structures or spare caps 42.

While as explained the stacks 45 comprise carbon fiber pultrusion strips 46, it is certainly possible that they may also comprise glass fiber pultrusion strips for reinforcing the respective flange structure.

Also, this embodiment comprising only a single first web 16 shows the respective advantages resulting from the use of this single first web 16 as already explained in regard to the first embodiment according to FIGS. 3-5.

The integration of the second reinforcement structures 42 as an integral flange part of the second web 17 is also advantageous, as the adhesive joint of the respective reinforcement structure flanges to the inner layer 28 of the half shells 12, 13, realised by the adhesive 44, takes less stress or loads due to the integral arrangement of the second reinforcement structures 42 at the second web 17. As the web 17 with the second reinforcement structures 42 is built as a separate component, an optimal web setup may be achieved, together with an improved inspection possibility regarding the web quality. Also, in case of need, any repair is easier, as the reinforcement structures 42 are no integral part of the respective shell 12, 13, and are therefore accessible.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A wind turbine blade, with a generally hollow blade body comprising an upper and a lower half shell and a single first web and a second web each extending in a lengthwise direction of the blade and being disposed between and connected to the upper and the lower half shell, wherein the single first web is substantially centered in a maximum thickness point when viewed in a cross section of the wind turbine blade, with the second web being arranged closer to a trailing edge of the blade and extending only along a part of the trailing edge, with each web comprising an upper and a lower flange connecting the respective web to the respective half shell, and with the single first web and the second web being supported via respective first and second reinforcement structures relative to the respective half shell, which reinforcement structures extend in the lengthwise direction of the blade, wherein the first reinforcement structures supporting the single first web comprise at least three stacks composed of several pultruded composite strips comprising carbon fibers with the strips being fixed in a resin matrix, wherein the at least three stacks follow a bended shape of the respective half shell, and wherein the second reinforcement structures supporting the second web are different than the first reinforcement structures supporting the single first web, and either comprise at least one stack composed of separate glass and/or carbon fiber layers disposed between an outer and an inner layer of the respective upper and lower shell and infused together with the outer and inner layers with resin, wherein the respective flanges of the second web are attached to the inner layer of the respective upper and lower shell, and wherein the second reinforcement structures do not comprise any pultruded carbon fiber strips, or comprise at least one stack composed of glass and/or carbon fiber layers infused with resin or of several pultruded composite strips comprising carbon fibers with the strips being fixed in a resin matrix, which stack is an integral part of the second web and builds the respective flange, wherein the second web is a prefabricated separate component, wherein the flanges of the second web are attached to the inner layer of the respective upper and lower shell.

2. The wind turbine blade according to claim 1, wherein the first reinforcement structures are disposed between the outer and the inner layer of the respective upper and lower shell.

3. The wind turbine blade according to claim 1, wherein the first reinforcement structures comprise biaxial glass and/or carbon fiber layers between each pair of strips which layers are infused with resin.

4. The wind turbine blade according to claim 1, wherein the second reinforcement structures each comprise multiple stacks arranged in parallel.

5. The wind turbine blade according to claim 1, wherein the glass and/or carbon fiber layers of the second reinforcement structure are uniaxial layers.

6. The wind turbine blade according to claim 1, wherein at least one core element is provided between the inner and the outer layer of the upper and lower half shell adjacent to the respective integral second reinforcement structures of the second web attached to the inner layer.

7. The wind turbine blade according to claim 6, wherein the core elements are made of wood, polymer or a composite material.

8. The wind turbine blade according to claim 6, wherein the first reinforcement structures and/or the second reinforcement structures and/or the core elements have a greater width than the respective adjacent flange of the respective first and/or second web.

9. The wind turbine blade according to claim 6, wherein several further core elements are provided between the outer and the inner layer of the respective upper and lower half shell.

10. The wind turbine blade according to claim 9, wherein the further core elements are made of foam, wood or polymer.

11. The wind turbine comprising several wind turbine blades according to claim 1.

\* \* \* \* \*